United States Patent [19] … [11] Patent Number: 4,748,212
Murachi et al. … [45] Date of Patent: May 31, 1988

[54] ADHESIVE COMPOSITION

[75] Inventors: Tatsuya Murachi; Masakazu Nakane, both of Aichi, Japan

[73] Assignee: Toyoda Gosei Co., Ltd., Aichi, Japan

[21] Appl. No.: 58,624

[22] Filed: Jun. 4, 1987

Related U.S. Application Data

[63] Continuation of Ser. No. 784,632, Oct. 4, 1985, abandoned.

[30] Foreign Application Priority Data

| Oct. 4, 1984 | [JP] | Japan | 59-208689 |
| Dec. 8, 1984 | [JP] | Japan | 59-259726 |
| Dec. 10, 1984 | [JP] | Japan | 59-261567 |
| Dec. 11, 1984 | [JP] | Japan | 59-261262 |
| Dec. 17, 1984 | [JP] | Japan | 59-265543 |
| Jan. 30, 1985 | [JP] | Japan | 60-15693 |
| Jan. 30, 1985 | [JP] | Japan | 60-15694 |
| Mar. 22, 1985 | [JP] | Japan | 60-58751 |
| Apr. 4, 1985 | [JP] | Japan | 60-71739 |
| Apr. 10, 1985 | [JP] | Japan | 60-75968 |
| Apr. 13, 1985 | [JP] | Japan | 60-78674 |
| May 16, 1985 | [JP] | Japan | 60-104586 |
| May 16, 1985 | [JP] | Japan | 60-104587 |

[51] Int. Cl.$^4$ ............................................. C08F 8/20
[52] U.S. Cl. ........................... 525/359.2; 525/329.3; 525/332.8; 525/332.9; 525/333.1; 525/359.3
[58] Field of Search ........................... 525/359.2, 359.3

[56] References Cited

U.S. PATENT DOCUMENTS

| 3,035,017 | 5/1962 | Winters et al. | 525/359.3 |
| 3,326,742 | 6/1967 | Shepherd | 161/227 |
| 3,402,136 | 9/1968 | Sakoyagi et al. | 525/359.3 |
| 3,960,822 | 6/1976 | Davis et al. | 525/359.3 |
| 4,020,127 | 4/1977 | Kennedy et al. | 525/359.4 |
| 4,117,036 | 9/1978 | Honda et al. | 525/359.3 |

Primary Examiner—Joseph L. Schofer
Assistant Examiner—Bernard Lipman
Attorney, Agent, or Firm—Cushman, Darby & Cushman

[57] ABSTRACT

There is provided an adhesive composition to increase the bond strength of coating material and adhesive to be applied to vulcanized polyolefin rubber or polyolefin resin. It comprises a hydrocarbon polymer, a halogenating agent to be incorporated in said hydrocarbon polymer, and a solvent in which are dissolved said hydrocarbon polymer and halogenating agent. The hydrocarbon polymer is any one of a polymer having a saturated or partly saturated main chain with at least one terminal hydroxyl group, a polymer having a saturated or partly saturated main chain with a carboxyl group, a functional hydrocarbon polymer having a saturated aliphatic ring, and a polymer having polyerizable unsaturated groups. The halogenating agent is an alkyl hypohalide, a compound having the

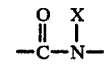

bond (where X is a halogen) in the molecule, or a hypohalogenite.

3 Claims, 1 Drawing Sheet

ADHESIVE COMPOSITION

This is a continuation of application Ser. No. 784,632, filed Oct. 10, 1984 and now abandoned.

BACKGROUND OF THE INVENTION

1. Field of the Invention

The present invention relates to an adhesive composition to increase the adhesion of coating materials and adhesives to be applied to the surface of polyolefin polymers such as vulcanized polyolefin rubbers and polyolefin resins.

2. Description of the Prior Art

Among a variety of industrial rubbers and synthetic resins, vulcanized polyolefin rubbers such as ethylene-propylene-diene terpolymer (EPDM) and ethylene-propylene copolymer rubber (EPM) and polyolefin resins such as polypropylene (PP) and polyethylene (PE) have come into general use because of their superior weather resistance, aging resistance, and ozone resistance over natural rubber (NR) and synthetic rubbers such as styrene-butadiene copolymer rubber (SBR), polybutadiene rubber (BR), isobutylene-isoprene copolymer rubber (IIR), chloroprene rubber (CR), acrylonitrile-butadiene copolymer rubber (NBR), and polyisoprene rubber (IR), and synthetic resins such as ABS resin, polystyrene resin (PS), acrylonitrile-styrene copolymer resin (AS), and ethylene-vinyl acetate copolymer resin (EVA).

SUMMARY OF THE INVENTION

It is an object of the present invention to provide an adhesive composition which, on account of the active action of polar halogens, exhibits good adhesion for not only common rubbers and synthetic resins but also polyolefin rubbers and polyolefin resins which are poor in adhesion to coating materials and adhesives.

It is another object of the invention to provide an adhesive composition which readily cures and forms adhesive coating film having a desired hardness according to the composition of the substrate rubber or synthetic resin.

It is further another object of the invention to provide an adhesive composition which forms adhesive coating film having a high resilience and tensile strength.

It is still further another object of the invention to provide a molded item of olefin polymer having an adhesive film that improves the adhesion of a coating material and adhesive applied to the surface thereof.

It is still more specific object of the invention to provide weatherstrips, glass runs, and flocked products which are improved in heat resistance, weather resistance, and wear resistance at high temperatures.

It is even further object of the invention to provide a structure of attaching a molding to an automobile which prevents the molding from peeling off from the automobile even after use for a long period of time.

The adhesive composition of this invention comprises a hydrocarbon polymer, a halogenating agent incorporated in said hydrocarbon polymer, and a solvent in which said hydrocarbon polymer and said halogenating agent are dissolved.

Other and further objects of the invention will become obvious upon an understanding of the illustrative embodiments about to be described or will be indicated in the appended claims, and various advantages not referred to herein will occur to one skilled in the art upon employment of the invention in practice.

DETAILED DESCRIPTION OF THE PREFERRED EMBODIMENTS

The following description deals with the compounds that constitute the adhesive composition of the invention.

The polymer having a saturated or partly saturated main chain with at least one terminal hydroxyl group is a liquid or solid polymer having an average molecular weight of 500 to 10000 (preferably 1000 to 5000). The average number of hydroxyl groups per molecule is 1.5 to 5.0 (preferably 1.8 to 3.0) and the main chain has a degree of saturation greater than 90% (preferably greater than 98%). (This polymer is referred to as hydroxyl group-containing polymer hereinafter.) Commercially available examples of this polymer include "Polytail H" (solid) and "Polytail HA" (liquid) made by Mitsubishi Chemical Industries, Ltd.

The hydroxyl group-containing polymer is produced by hydrogenating in the usual way a diene polymer or copolymer having hydroxyl groups which is obtained by the conventional polymerization process for telechelic rubbers. The diene used as a raw material for this polymer includes conjugated dienes such as 1,3-butadiene, isoprene, chloroprene, 1,3-pentadiene, and 2,3-dimethylbutadiene-1,3. The monomer to be copolymerized with the diene in the production of the copolymer includes vinyl monomers such as styrene, vinyltoluene, methyl acrylate, methyl methacrylate, and vinyl chloride.

The hydrocarbon polymer having a saturated or partly saturated main chain with a carboxyl group is a polymer synthesized according to the process disclosed in Japanese Patent Laid-open No. 7894/1975. It is produced by reacting a living polymer with a halogenoalkylene oxide and/or polyepoxide, reacting the resulting polymer with monoepoxide, and further reacting the reaction product with an organic polycarboxylic anhydride. (This polymer is referred to as carboxyl group-containing polymer hereinafter).

The above-mentioned living polymer is a dialkali metal polymer having a molecular weight of 500 to 10000 and containing alkali metal atoms at both terminals of the molecule. It is obtained by reacting a conjugated diolefin and/or a vinyl compound with an alkali metal or organic alkali metal by the known method.

The halogenoalkylene oxide is a compound such as epichlorohydrin represented by the formula below:

(where X is a halogen). The polyepoxide is a compound such as diglycidyl ether of bisphenol A which has two or more epoxy groups in one molecule. The monoepoxide is an alkylene oxide such as ethylene oxide which has one epoxy group in one molecule.

The organic polycarboxylic acid anhydride is an anhydride of an aliphatic polycarboxylic acid such as maleic acid and succinic acid, an anhydride of an aromatic polycarboxylic acid such as phthalic acid and pyromellitic acid, and an anhydride of an alicyclic polycarboxylic acid such as hexahydrophthalic acid and tetrahydrophthalic acid.

The polymer of the above-illustrated composition will have a desired molecular weight and a desired amount of carboxyl groups, if the ratio of the living polymer to the halogenoalkylene oxide and/or polyepoxide is properly selected. The thus obtained polymer contains carboxyl groups and hence reacts with a variety of crosslinking agents to give a large variety of compositions ranging from rubbery elastomers to hard resins. This is the feature of the adhesive composition of the invention.

The following examples illustrate the process for producing the adhesive composition of this invention. They are not intended to limit the scope of this invention.

Carboxyl Group-containing Polymer 1

At first, a dilithium initiator was prepared by reacting naphthalene, metallic lithium, and isoprene with one another at a molar ratio of 2:40:30 in diethyl ether. Using 0.04 mol of this dilithium initiator, 50 g of butadiene was polymerized in cyclohexane to give living polybutadiene having a molecular weight of 1250.

To the solution of this living polybutadiene were added 0.02 mol of epichlorohydrin solution in cyclohexane and then 0.08 mol of propylene oxide solution in tetrahydrofuran. The reactants were allowed to stand overnight to complete reaction. Subsequently, 0.08 mol of phthalic anhydride solution in tetrahydrofuran was added, and reaction was performed at room temperature for 30 minutes and then at 70° C. for 3 hours.

To the resulting viscous liquid was added 2,6-di-t-butyl-p-cresol as a stabilizer. The product was purified by reprecipitation from toluene-methanol solution in the usual way. Thus there was obtained a carboxyl group-containing polymer having an average molecular weight of 2800.

Carboxyl Group-containing Polymer 2

Living polybutadiene having a molecular weight of 1250 was prepared in the same manner as above. To the solution of this living polybutadiene were added 0.01 mol of vinylcyclohexene diepoxide solution in tetrahydrofuran and then 0.12 mol of propylene oxide solution in tetrahydrofuran. The reactants were allowed to stand overnight to complete reaction. Subsequently, 0.08 mol of maleic anhydride solution in tetrahydrofuran was added, and reaction was performed at room temperature for 30 minutes and then at 70° C. for 3 hours.

The resulting polymer, with a stabilizer added, was decomposed by hydrochloric acid. The decomposition product was purified by reprecipitation from toluene-methanol solution in the usual way. Thus there was obtained a carboxyl group-containing polymer having an average molecular weight of 1900.

The functional hydrocarbon polymer containing a saturated aliphatic ring (referred to as saturated aliphatic ring-containing polymer hereinafter) is a polymer obtained by hydrogenating a functional hydrocarbon polymer containing an aromatic ring as disclosed in Japanese Patent Laid-open No. 71391/1976. The preferred one is obtained by hydrogenating a copolymer composed of a conjugated diene compound and an aromatic compound containing a vinyl group. It has an average molecular weight of 500 to 50000, preferably 1000 to 30000.

The above-mentioned diene includes, for example, 1,3-butadiene, isoprene, 1,3-pentadiene, and 2,3-dimethylbutadiene. The functional hydrocarbon polymer containing an aromatic ring as mentioned above is obtained by polymerizing an aromatic monomer alone or with another comonomer. The production process thereof is disclosed in, for example, Japanese Patent Publication Nos. 8190/1962, 342/1963, 5993/1963, 14747/1965, 22048/1967, and 36273/1972.

The above-mentioned aromatic ring includes styrene, vinyltoluene, vinylnaphthalene, phenylbutadiene, methylstyrene, divinylbenzene, coumarone, indene, vinylphenol, vinylbenzoic acid, cinnamic acid, and other aromatic compounds and derivatives thereof. They may be used alone or in combination with one another.

Incidentally, the above-mentioned diene may be copolymerized with such comonomer as heterocyclic compound, acrylic acid derivative, methacrylic acid derivative, fumaric acid derivative, and maleic acid derivative.

The functional hydrocarbon polymer containing an aromatic ring as mentioned above contains the aromatic ring in an amount of 1 to 100 parts by weight, preferably 5 to 70 parts by weight, based on 100 parts by weight of the polymer. In addition, the functional group in the polymer is the hydroxyl group or carboxyl group, and the number of the functional groups in one molecule is 1 and above, preferably 1.5 and above.

The above-mentioned saturated aliphatic ring-containing polymer is obtained by the catalytic hydrogenation of the above-mentioned functional hydrocarbon polymer containing an aromatic ring. The catalyst for hydrogenation is ruthenium, palladium, platinum, rhodium, or osmium. These metallic catalysts may be used alone or in combination with a carrier such as carbon black, aluminum, diatomaceous earth, barium carbonate, calcium carbide, and silica. The saturated aliphatic ring-containing polymer provides a cured product superior in resilience, tensile properties, weather resistance, water resistance, moisture resistance, ozone resistance, and heat resistance.

The following examples illustrate the process for producing the above-mentioned adhesive composition.

Saturated Aliphatic Ring-Containing Polymer 1

In an autoclave, with the atmosphere therein replaced with argon, were placed 75 g of 1,3-butadiene, 25 g of sytrene, 70 g of isopropyl alcohol, and 10 g of 60% hydrogen peroxide, followed by polymerization reaction at 90° C. for 5 hours. Thus there was obtained a butadiene-styrene copolymer.

In an autoclave were placed 50 g of the copolymer, 50 g of cyclohexane, and 5 g of carbon-supported ruthenium catalyst (5%). The atmosphere in the autoclave was replaced with argon, and then hydrogen was introduced into the autoclave for hydrogenation under a pressure of 50 kg/cm$^2$ at 100° C. The catalyst was filtered out and the resulting hydrogenated product was caused to separate out in methanol. Thus there was obtained the saturated aliphatic ring-containing polymer. Saturated aliphatic ring-containing polymer 2

As in the above-mentioned saturated aliphatic ring-containing polymer 1, a butadiene-styrene copolymer was obtained by polymerizing 64 g of 1,3-butadiene and 36 g of styrene in the presence of 70 g of isopropyl alcohol and 8 g of 60% hydrogen peroxide at 120° C.

for 2 hours. This copolymer was passed into the saturated aliphatic ring-containing polymer 2 by hydrogenation in the same manner as in the above-mentioned saturated aliphatic ring-containing polymer 1.

The polymer having a polymerizable unsaturated group is one which is synthesized according to the process disclosed in Japanese Patent Laid-open No. 7893/1975. The process includes the steps of reacting a living polymer with a halogenoalkylene oxide and/or polyepoxide, reacting the resulting polymer with a monoepoxide, and further reacting the reaction product with a halide or ester of a carboxylic acid having a polymerizable unsaturated group.

The halide or ester of a carboxylic acid having a polymerizable unsaturated group includes carboxylic acid halides such as acrylic acid chloride and methacrylic acid bromide, and esters of such a carboxylic acid with methanol or ethanol.

The polymer of the above-illustrated composition will have a desired amount of polymerizable unsaturated groups, if the ratio of the living polymer to the halogenoalkylene oxide and/or polyepoxide is properly selected. The thus introduced polymerizable unsaturated groups react with a variety of polymerizable substances to give a large variety of cured products ranging from rubbery elastomers to hard resins.

Thus it is possible to obtain a cured product of desired composition according to the properties and applications of vulcanized polyolefin rubber substrate. This is the feature of the adhesive composition of the invention.

The following examples illustrate the process for producing the above-mentioned adhesive composition.

Polymerizable Unsaturated Group-containing Polymer 1

At first, a dilithium initiator was prepared by reacting naphthalene, metallic lithium, and isoprene with one another at a molar ratio of 2:40:30 in diethyl ether. Using 0.04 mol of this dilithium initiator, 50 g of butadiene was polymerized in cyclohexane to give living polybutadiene having a molecular weight of 1250.

To the solution of this living polybutadiene were added 0.02 mol of vinylcyclohexene diepoxide and then 0.08 mol of propylene oxide. The reactants were allowed to stand overnight to complete reaction. Subsequently, 0.1 mol of methacrylic acid chloride was added, and reaction was performed at room temperature for 5 hours.

To the resulting low viscosity liquid was added 2,6-di-t-butyl-p-cresol as a stabilizer. The product was purified by reprecipitation from toluene-methanol solution in the usual way. Thus there was obtained a polymer having an average molecular weight of 2600.

Polymerizable Unsaturated Group-containing Polymer 2

Living polybutadiene having a molecular weight of 1250 was prepared in the same manner as above. To the solution of this living polybutadiene were added 0.02 mol of epichlorohydrin and then 0.08 mol of ethylene oxide. The reactants were allowed to stand overnight to complete reaction. Subsequently, 0.12 mol of methyl methacrylate was added, and reaction was performed at room temperature for 30 minutes and further at 70° C. for 5 hours.

To the resulting low viscosity solution was added 2,6-di-t-butyl-p-cresol as a stabilizer. The product was purified by reprecipitation from toluene-methanol solution in the usual way, followed by drying. Thus there was obtained a polymer having an average molecular weight of 2700.

The alkyl hypohalide is a normal, secondary, or tertiary alkyl hypohalide, especially a tertiary alkyl hypochloride or hypobromide which is stable.

The preferred examples include tertiary butyl hypochloride, tertiary butyl hypobromide, tertiary amyl hypochloride, and tertiary amyl hypobromide. Additional examples include halogen-substituted alkyl hypochloride such as dichloro-, trichloro-, or fluoro-methyl hypochloride.

The compound having the bond (where X is a halogen) in the molecule includes halogenated succinimide such as N-bromosuccinimide; isocyanuric acid halide such as trichloroisocyanuric acid and dichloroisocyanuric acid; and halogenated hydantoin such as dichlorodiemthyl hydantoin.

The adhesive composition of this invention can be produced by merely mixing a hydrocarbon polymer, a compound having the bond, and/or alkyl hypohalide in a solvent at a prescribed ratio. The above-mentioned alkyl hypohalide should be added in an amount of 0.01 to 300 parts by weight, preferably 0.01 to 100 parts by weight, for 100 parts by weight of any one of the above-mentioned four kinds of hydrocarbon polymers. If the amount is less than 0.01 parts or more than 300 parts, no desired effect is produced.

The compound having the bond (where X is a halogen) in the molecule should be added in an amount less than 100 parts by weight, preferably less than 50 parts by weight, for 100 parts by weight of any one of the above-mentioned four kinds of hydrocarbon polymers.

The solvent used for mixing these components is selected from aromatic hydrocarbons such as benzene, toluene, and xylene; ethers such as dioxane and tetrahydrofuran; esters such as ethyl acetate and propyl acetate; ketones such as acetone, cyclohexanone, and methyl ethyl ketone; and chlorinated hydrocarbons such as ethyl chloride, chloroform, and carbon tetrachloride. They may be used individually or in combination with one another.

The concentration of the solution of the above-mentioned components should be lower than 30% (as solids). Above 30%, the solution is poor in stability and the solids might separate out.

The vulcanized polyolefin rubber to which the adhesive composition of this invention is applied is the above-mentioned EPDM or EPM, which may contain rubber components such as NR, SBR, IIR, CR, and NBR or resin components such as ABS, PS, PE, PP, and EVA in such an amount that does not change the properties of EPDM or EPM. The content of the rubber component or resin component is usually less than half the amount of EPDM or EPM.

The vulcanized polyolefin rubber is incorporated with commonly used ingredients such as (1) sulfur, morpholine disulfide, or dicumyl peroxide as a vulcanizing agent; (2) 2-mercaptobenzothiazole, zinc dimethyldithiocarbamate, or tetramethylthiuram disulfide as a vulcanization accelerator; (3) phenyl-α-naphthylamine or 2,6-di-t-butyl-p-cresol as an antioxidant and antiozonant; (4) carbon black, magnesium carbonate, or clay as a filler; and (5) dioctyl sebacate or mineral oil as a plasticizer.

The above-mentioned adhesive composition can be applied to the above-mentioned polyolefin rubber or polyolefin resins by the ordinary coating methods such as dipping, brushing, and spraying without any special equipment.

Being of one-pack type, the adhesive composition has a long potlife. When it becomes viscous due to evaporation of solvent, it is readily diluted with a solvent.

The following examples illustrate the formulation of the above-mentioned adhesive composition.

TABLE A

| | | | | unit: parts by weight | | | |
|---|---|---|---|---|---|---|---|
| Example | Hydroxyl group-containing polymer | | Compound having O=C—N—X bond | | | Organic solvent | |
| 1 | Polytail H* | 5 | Trichloroisocyanuric acid | | 0.5 | Toluene | 95 |
| 2 | Polytail H | 5 | Trichloroisocyanuric acid | | 1 | Toluene | 95 |
| 3 | Polytail H | 5 | Trichloroisocyanuric acid | | 2 | Toluene | 95 |
| 4 | Polytail H | 10 | Trichloroisocyanuric acid | | 1 | Toluene | 90 |
| 5 | Polytail H | 5 | N—bromosuccinimide | | 1 | Toluene | 95 |

*Trade name of Mitsubishi Chemical Industries, Ltd.

TABLE B

| | Example 1 | Example 2 | Example 3 | Example 4 | Example 5 |
|---|---|---|---|---|---|
| Adhesion | 100/100 | 100/100 | 100/100 | 100/100 | 100/100 |

TABLE C

| | | | unit: parts by weight | | | |
|---|---|---|---|---|---|---|
| Example | Carboxyl group-containing polymer | | Compound having O=C—N—X bond, and/or alkyl hypohalide | | Organic solvent | |
| 1 | Polymer 1 | 5 | Trichloroisocyanuric acid | 1 | Toluene | 95 |
| 2 | Polymer 2 | 10 | Trichloroisocyanuric acid | 1 | Toluene | 90 |
| 3 | Polymer 1 | 5 | N—bromosuccinimide | 1 | Toluene | 95 |
| 4 | Polymer 1 | 5 | Trichloroisocyanuric acid | 0.5 | Toluene | 95 |
| 5 | Polymer 1 | 5 | Trichloroisocyanuric acid | 2 | Toluene | 95 |
| 6 | Polymer 1 | 5 | Tertiary-butyl hypochloride | 1 | Toluene | 95 |
| 7 | Polymer 1 | 5 | Tertiary-butyl hypochloride | 0.5 | Toluene | 95 |
| 8 | Polymer 1 | 5 | Tertiary-butyl hypochloride | 2 | Toluene | 95 |
| 9 | Polymer 1 | 5 | Tertiary-butyl hypochloride | 5 | Toluene | 95 |
| 10 | Polymer 2 | 10 | Tertiary-butyl hypochloride | 3 | Methyl ethyl ketone | 90 |
| 11 | Polymer 1 | 10 | Trichloroisocyanuric acid | 1 | Toluene | 90 |
| | | | Tertiary-butyl hypochloride | 3 | | |
| 12 | Polymer 1 | 10 | N—bromosuccinimide | 1 | Toluene | 90 |
| | | | Tertiary-butyl hypochloride | 3 | | |

TABLE D

| | | | unit: parts by weight | | | |
|---|---|---|---|---|---|---|
| Example | Saturated aliphatic ring-containing polymer | | Compound having O=C—N—X bond, and/or alkyl hypohalide | | Organic solvent | |
| 1 | Polymer 1 | 5 | Trichloroisocyanuric acid | 1 | Toluene | 95 |
| 2 | Polymer 1 | 5 | N—bromosuccinimide | 1 | Toluene | 95 |
| 3 | Polymer 1 | 5 | Trichloroisocyanuric acid | 0.5 | Toluene | 95 |
| 4 | Polymer 1 | 5 | Trichloroisocyanuric acid | 2 | Toluene | 95 |
| 5 | Polymer 2 | 10 | Trichloroisocyanuric acid | 1 | Toluene | 90 |
| 6 | Polymer 1 | 5 | Tertiary-butyl hypochloride | 1 | Toluene | 95 |
| 7 | Polymer 1 | 5 | Tertiary-butyl hypochloride | 0.5 | Toluene | 95 |
| 8 | Polymer 1 | 5 | Tertiary-butyl hypochloride | 2 | Toluene | 95 |
| 9 | Polymer 1 | 5 | Tertiary-butyl hypochloride | 5 | Toluene | 95 |
| 10 | Polymer 2 | 10 | Tertiary-butyl hypochloride | 3 | Methyl ethyl ketone | 90 |
| 11 | Polymer 1 | 10 | Trichloroisocyanuric acid | 1 | Toluene | 90 |
| | | | Tertiary-butyl hypochloride | 1 | | |
| 12 | Polymer 1 | 10 | N—bromosuccinimide | 1 | Toluene | 90 |
| | | | Tertiary-butyl hypochloride | 1 | | |

TABLE E

| | | | unit: parts by weight | | | |
|---|---|---|---|---|---|---|
| Example | Polymerizable unsaturated group-containing polymer | | Compound having O=C—N—X bond, and/or alkyl hypohalide | | Organic solvent | |
| 1 | Polymer 1 | 5 | Trichloroisocyanuric acid | 1 | Toluene | 95 |
| 2 | Polymer 1 | 10 | Trichloroisocyanuric acid | 2.5 | Toluene | 90 |
| 3 | Polymer 2 | 5 | Trichloroisocyanuric acid | 2 | Toluene | 95 |
| 4 | Polymer 1 | 5 | N—bromosuccinimide | 2 | Toluene | 95 |
| 5 | Polymer 1 | 5 | Tertiary-butyl hypochloride | 1 | Toluene | 95 |

TABLE E-continued

| | | | Compound having $\overset{O}{\underset{\|}{C}}\overset{X}{\underset{\|}{N}}$ bond, | | | |
|---|---|---|---|---|---|---|
| Example | Polymerizable unsaturated group-containing polymer | | and/or alkyl hypohalide | | Organic solvent | |
| 6 | Polymer 1 | 5 | Tertiary-butyl hypochloride | 0.5 | Toluene | 95 |
| 7 | Polymer 1 | 5 | Tertiary-butyl hypochloride | 2 | Toluene | 95 |
| 8 | Polymer 1 | 5 | Tertiary-butyl hypochloride | 5 | Toluene | 95 |
| 9 | Polymer 1 | 10 | Tertiary-butyl hypochloride | 3 | Methyl ethyl ketone | 90 |
| 10 | Polymer 2 | 10 | Trichloroisocyanuric acid | 1 | Toluene | 90 |
| | | | Tertiary-butyl hypochloride | 1 | | |
| 11 | Polymer 1 | 10 | N—bromosuccinimide | 1 | Toluene | 90 |
| | | | Tertiary-butyl hypochloride | 1 | | |

The adhesive compositions obtained in the above-mentioned examples were examined for adhesion as follows:

Test Method

EPDM test pieces, 2 mm thick, were prepared by vulcanizing the rubber compound shown in Table 1 at 160° C. for 30 minutes.

TABLE 1

| | parts by weight |
|---|---|
| EPDM | 100 |
| Carbon black | 70 |
| Mineral oil | 35 |
| Zinc oxide | 5 |
| Stearic acid | 1 |
| Vulcanization accelerator | 2 |
| Sulfur | 1.5 |

Each adhesive composition prepared in the above-mentioned examples was applied to each of the test pieces prepared as mentioned above. After drying at room temperature for 30 minutes, the test piece was coated with a urethane paint prepared by reaction the urethane composition as shown in Table 2 in dry nitrogen at 80° C. for 3 hours. The coated urethane paint was cured at room temperature for 24 hours.

TABLE 2

| | parts by weight |
|---|---|
| Polypropylene glycol (molecular weight = 1000) | 100 |
| 4,4'-diphenylmethane-diisocyanate | 100 |
| Ethylene glycol | 0.62 |
| Toluene | 201 |

The coated test pieces were examined for adhesion of coated film by cross-cut test. All the test pieces exhibited sufficient adhesion (100/100).

The following Comparative Examples 1 to 3 illustrate the compositions which are conventionally used as a primer for polyolefin rubber products or polyolefin resin products.

COMPARATIVE EXAMPLE 1

A composition was prepared by diluting "Becozol J-534" (linseed oil-modified long oil alkyl resin made by Dainippon Ink Chemical Industry Co., Ltd.) with mineral base and adding cobalt naphthenate as a dryer.

COMPARATIVE EXAMPLE 2

A composition was prepared by diluting "Olyster M55-80A" (moisture-curable polyurethane resin made by Mitsui Toatsu Chemical Industry Co., Ltd.) with toluene.

COMPARATIVE EXAMPLE 3

A composition was prepared by diluting "Esterresin 20" (saturated polyester resin made by Toyoboseki Co., Ltd.) with a 1:9 (by weight) mixed solvent of methyl ethyl ketone and toluene.

Each of the compositions prepared in Comparative Examples 1 to 3 was applied to the above-mentioned EPDM test piece, and the urethane paint of the above-mentioned composition (Table 2) was further applied. After curing for 24 hours, the coating film was examined for adhesion by cross-cut test. The result was 0/100, or all the cross-cut pieces were peeled off.

The following description is concerned with an embodiment of the adhesive composition of this invention which is a polyolefin molding having adhesive film.

The polyolefin molding having adhesive film has a structure mentioned below.

The polyolefin molding having adhesive film is prepared by coating the above-mentioned polyolefin molding with a dilute solution of the above-mentioned hydrocarbon polymer. The diluting solvent is selected from saturated hydrocarbons such as n-hexane and cyclohexane; aromatic hydrocarbons such as benzene, toluene, and xylene; chlorinated hydrocarbons such as ethyl chloride, chloroform, and carbon tetrachloride; acetic acid esters; and ketones. They are used alone or in combination with one another.

The concentration of the hydrocarbon polymer in the diluted solution should be lower than 30%; otherwise, solids might separate out at room temperature.

Being of one-pack type, the hydrocarbon polymer has a long potlife. When it becomes viscous due to evaporation of solvent, it is readily diluted with a solvent. It can be applied by the ordinary coating methods such as dipping, brushing, and spraying without any special equipment.

The following Table F shows Examples 1 to 11 in which the composition is composed of a compound having the bond and/or alkyl hypohalide and a solvent.

TABLE F

| Example | Compound having $\overset{O}{\underset{\|}{C}}\overset{X}{\underset{\|}{N}}$ bond, and/or alkyl hypohalide | | Organic solvent | |
|---|---|---|---|---|
| 1 | Trichloroisocyanuric acid | 1 | Toluene | 99 |
| 2 | N—bromosuccinimide | 1 | Toluene | 99 |
| 3 | Trichloroisocyanuric acid | 0.5 | Toluene | 99 |
| 4 | Trichloroisocyanuric acid | 2 | Toluene | 99 |
| 5 | Trichloroisocyanuric acid | 5 | Toluene | 99 |
| 6 | Tertiary-butyl hypochloride | 1 | Xylene | 99 |
| 7 | Tertiary-butyl hypochloride | 100 | Xylene | 100 |
| 8 | Tertiary-butyl hypochloride | 75 | Xylene | 100 |

TABLE F-continued unit: parts by weight

| Example | Compound having<br>—C(=O)—N(X)— bond,<br>and/or alkyl hypohalide | | Organic solvent | |
|---|---|---|---|---|
| 9 | Tertiary-butyl hypochloride | 50 | Xylene | 100 |
| 10 | Trichloroisocyanuric acid | 1 | Toluene | 99 |
|  | Tertiary-butyl hypochloride | 20 |  |  |
| 11 | Trichloroisocyanuric acid | 1 | Toluene | 99 |
|  | Tertiary-butyl hypochloride | 30 |  |  |

Then, a rubber compound of the formulation as shown in the above-mentioned Table 1 was vulcanized at 160° C. for 30 minutes to give an EPDM substrate.

The EPDM substrate thus prepared was dipped in a 5% solution of "Polytail-H" in toluene for 1 minute, followed by air-drying at room temperature for 30 minutes. Then it was dipped in a solution of the above-mentioned Examples 1 to 11 for 30 seconds, followed by air-drying at room temperature for 30 minutes. In this way an adhesive layer was formed on the surface of the EPDM substrate.

The EPDM substrate was further coated with a urethane paint obtained by reacting the urethane compound of the formulation as shown in the above-mentioned Table 2 at 80° C. in dry nitrogen gas for 3 hours. The coating was cured at room temperature for 24 hours.

The above-mentioned urethane paint was examined for adhesion by cross-cut test. It exhibited sufficient adhesion (100/100).

The film of saturated aliphatic ring-containing polymer can be formed on the surface of a polyolefin molding by applying a properly diluted solution of saturated aliphatic ring-containing polymer. The solvent used for dilution may be saturated hydrocarbons such as n-hexane and cyclohexane, aromatic hydrocarbons such as benzene, toluene, and xylene, alcohols such as isopropyl alcohol and n-butyl alcohol, ethers such as diethyl ether and tetrahydrofuran, acetic acid esters, and ketones. They may be used alone or in combination with one another.

The saturated aliphatic ring-containing polymer is readily cured with a curing agent such as isocyanate and polycarboxylic acid. It has a very long pot-life unless a curing agent is added, and it can be diluted again with a solvent when it becomes viscous due to evaporation of solvent.

The following description is concerned with the reactive film to be formed on the film of the above-mentioned saturated aliphatic ring-containing polymer.

The compound having the bond (where X is a halogen) includes those which have been shown above.

The halogen compound is diluted with a solvent and the solution is applied onto the film of the above-mentioned saturated aliphatic ring-containing polymer. The preferred concentration is 0.5 to 5 parts by weight based on 100 parts by weight of solvent. With concentrations lower than 0.5 parts by weight, the solution does not produce any effect; and with concentration in excess of 5 parts by weight, the solution might cause unreacted products to separate out on the film surface.

The hypohalide includes, for example, sodium hypochlorite, sodium hypobromite, sodium hypodiodite, and calcium hypochlorite.

The concentration of the hypohalide should be such that the effective halogen concentration in the solution is 0.01 to 6%.

The above-mentioned solvent is water or an organic solvent listed as the solvent for the saturated aliphatic ring-containing polymer.

Where an organic solvent is used, the above-mentioned compound having the bond (where X is a halogen) in the molecule and/or alkyl hypohalide should be dissolved in the prescribed concentration as mentioned above. Where water is used as a solvent, the above-mentioned compound having the bond (where X is a halogen) in the molecule and/or alkyl hypohalide should be dissolved in the prescribed concentration as mentioned above.

The solution containing a hypohalide may be incorporated with an organic acid such as formic acid, acetic acid, propionic acid, maleic acid, and fumaric acid to adjust the solution to pH 1.5–5, whereby the halogenation can be accomplished effectively.

The following description is concerned with the preparation of the halogen compound-containing solution.

Halogen compound-containing solutions 1 to 14 were prepared according to the formulations shown in Table 3. The solvent was toluene for solutions 1 to 5, xylene for solutions 6 to 11, and water for solutions 12 to 14.

TABLE 3 unit: parts by weight

| Solution 1 | Trichloroisocyanuric acid | 1 | Toluene | 100 |
|---|---|---|---|---|
| Solution 2 | N—bromosuccinimide | 1 | Toluene | 100 |
| Solution 3 | Trichloroisocyanuric acid | 0.5 | Toluene | 100 |
| Solution 4 | Trichloroisocyanuric acid | 2 | Toluene | 100 |
| Solution 5 | Trichloroisocyanuric acid | 5 | Toluene | 100 |
| Solution 6 | t-Butyl hypochloride | 25 | Xylene | 100 |
| Solution 7 | t-Butyl hypochloride | 45 | Xylene | 100 |
| Solution 8 | t-Butyl hypochloride | 50 | Xylene | 100 |
| Solution 9 | t-Butyl hypochloride | 55 | Xylene | 100 |
| Solution 10 | t-Butyl hypochloride | 75 | Xylene | 100 |
| Solution 11 | t-Butyl hypochloride | 100 | Xylene | 100 |
| Solution 12 | Aqueous solution of sodium hypochlorite<br>(Effective chlorine = 0.4%) | | 100 cc | |
|  | Glacial acetic acid | | 2 cc | |
| Solution 13 | Aqueous solution of sodium hypochlorite<br>(Effective chlorine = 0.5%) | | 100 cc | |
|  | Glacial acetic acid | | 2.5 cc | |
| Solution 14 | Aqueous solution of sodium hypochlorite<br>(Effective chlorine = 0.5%) | | 100 cc | |
|  | Glacial acetic acid | | 5 cc | |

The adhesive film formed with the saturated aliphatic ring-containing polymer in the above-mentioned Examples 1 and 2 and the above-mentioned halogen compound-containing solutions 1 to 14 was examined for adhesion according to the following test methods.

At first, 2 mm thick EPDM substrates were prepared by vulcanizing the rubber compound shown in the above-mentioned Table 1 at 160° C. for 30 minutes.

Then, each of the EPDM substrates was dipped in a 5% solution of the above-mentioned saturated aliphatic ring-containing polymer 1 or 2 in toluene for 1 minute, followed by drying at room temperature for 30 minutes. It was further dipped in one of the halogen compound-containing solutions 1 to 14 for 30 seconds, whereby the adhesive film was formed. The combination of the saturated aliphatic ring-containing polymer and the solution is shown in Table 4.

TABLE 4

| Test piece | Polymer | Solution |
| --- | --- | --- |
| 1 | 1 | 1 |
| 2 | 2 | 2 |
| 3 | 1 | 3 |
| 4 | 1 | 4 |
| 5 | 2 | 5 |
| 6 | 1 | 6 |
| 7 | 2 | 7 |
| 8 | 1 | 8 |
| 9 | 2 | 9 |
| 10 | 1 | 10 |
| 11 | 2 | 11 |
| 12 | 1 | 12 |
| 13 | 2 | 13 |
| 14 | 1 | 14 |

Each substrate, with the adhesive film formed thereon, was air-dried at room temperature for 30 minutes. Then each substrate was coated with a urethane paint prepared by reacting the urethane composition as shown in the above-mentioned Table 2 in dry nitrogen at 80° C. for 3 hours. The coated urethane paint was cured at room temperature for 24 hours.

The film coated on the substrate was examined for adhesion by cross-cut test. In all the cases, the sufficient adhesion (100/100) was obtained.

EPDM substrates were prepared by vulcanizing the rubber compound shown in the above-mentioned Table 1 at 160° C. for 30 minutes.

Then, each of the EPDM substrates was dipped in a 5% solution of the above-mentioned carboxyl group-containing polymer 1 in toluene for 1 minute, followed by drying at room temperature for 30 minutes, whereby the adhesive film was formed.

TABLE G

| | unit: parts by weight | | |
| --- | --- | --- | --- |
| Example | Compound having  —C—N— bond, and/or alkyl hypohalide | | Organic solvent |
| (i) | | | |
| 1 | Trichloroisocyanuric acid | 1 | Toluene 99 |
| 2 | N—bromosuccinimide | 1 | Toluene 99 |
| 3 | Trichloroisocyanuric acid | 0.5 | Toluene 99 |
| 4 | Trichloroisocyanuric acid | 2 | Toluene 99 |
| 5 | Trichloroisocyanuric acid | 5 | Toluene 99 |
| 6 | Trichloroisocyanuric acid | 100 | Toluene 99 |
| 7 | Tertiary-butyl hypochloride | 25 | Xylene 75 |
| 8 | Tertiary-butyl hypochloride | 75 | Xylene 100 |
| 9 | Tertiary-butyl hypochloride | 50 | Xylene 100 |
| 10 | Trichloroisocyanuric acid Tertiary-butyl hypochloride | 1 20 | Toluene 99 |
| 11 | Trichloroisocyanuric acid Tertiary-butyl hypochloride | 1 30 | Toluene 99 |
| (ii) | | | |
| Example 12 | Aqueous solution of sodium hypochlorite | | 100 cc |

TABLE G-continued

| | unit: parts by weight | |
| --- | --- | --- |
| Example | Compound having O X ‖ │ —C—N— bond, and/or alkyl hypohalide | Organic solvent |
| | (Effective chlorine = 0.4%) | |
| | Glacial acetic acid | 2 cc |
| Example 13 | Aqueous solution of sodium hypochlorite (Effective chlorine = 0.5%) | 100 cc |
| | Glacial acetic acid | 2.5 cc |
| Example 14 | Aqueous solution of sodium hypochlorite (Effective chlorine = 0.5%) | 100 cc |
| | Glacial acetic acid | 5 cc |

Then each substrate was coated with a urethane paint prepared by reacting the urethane composition as shown in the above-mentioned Table 2 in dry nitrogen at 80° C. for 3 hours. The coated urethane paint was cured at room temperature for 24 hours.

The film coated on the substrate was examined for adhesion by cross-cut test. In all the cases, the sufficient adhesion (100/100) was obtained.

Each of the EPDM substrate of the composition as shown in the above-mentioned Table 1 was dipped in a 5% solution in toluene of the above-mentioned polymer 1 containing a polymerizable unsaturated group for 1 minute, followed by air-drying at room temperature for 30 minutes, whereby the adhesive film was formed in the same manner as mentioned above. The substrate was then coated with the above-mentioned urethane paint, followed by drying at room temperature for 24 hours. The adhesive film was examined for adhesion by cross-cut test. Sufficient adhesion (100/100) was obtained.

The following description is concerned with the applications of the adhesive compound of this invention to automotive parts.

First Embodiment

The automotive weatherstrip of this invention is composed of a base material, primer composition, and urethane paint. They are described below one by one.

The base material constituting the weatherstrip is vulcanized polyolefin rubber.

The rubber may be expanded to a proper degree depending on the place where the weatherstrip is used. The rubber blowing agent includes, for example, N,N'-dinitropentamethylenetetramine, N,N'-dimethyl-N,N'-dinitrosoterephthalamide, azodicarbonamide, azobisisobutyronitrile, benzenesulfonyl hydrazide, p,p'-oxybis-(benzenesulfonyl hydrazide), and toluenesulfonyl hydrazide. The blowing agent may be incorporated with a proper amount of urea, salicylic acid, or the like as an auxiliary blowing agent according to the desired expansion ratio.

The primer composition is composed of the above-mentioned hydroxyl group-containing polymer and the compound having $$\begin{matrix} O & X \\ \| & | \\ -C-N- \end{matrix}$$

bond (where X is a halogen).

The primer composition is prepared by dissolving in a solvent 100 parts by weight of the hydroxyl group-containing polymer and 100 parts by weight, preferably less than 50 parts by weight of the compound having the bond (where X is a halogen).

The solvent is the same as that used for the dilution of the above-mentioned hydroxyl group-containing polymer.

The polyurethane paint used for the first embodiment is not a special one, but is a commercial one of either one-pack type or two-pack type.

No special equipment is required for the application of the above-mentioned primer composition and polyurethane paint to the weatherstrip base material. The above-mentioned primer composition is simply dissolved in a solvent with heating, if necessary, and the resulting solution of proper viscosity is applied in the usual way by dipping, spraying, or brushing.

Being of one-pack type, the primer composition has a long pot-life and it can be diluted again with a solvent when it becomes viscous due to evaporation of solvent.

The urethane paint can be applied by the above-mentioned method.

After the application of the urethane paint, silicone oil may be applied to prevent blocking or to improve wear resistance.

The effect of the first embodiment is described below with reference to the following examples.

An EPDM composition of the formulation shown in the above-mentioned Table 1 was extruded and the extrudate was vulcanized at 160° C. for 30 minutes, whereby an automotive weatherstrip was produced.

In the following examples, the urethane paint of the formulation shown in Table 5 was used.

TABLE 5

| | unit: parts by weight |
|---|---|
| Urethane prepolymer | 140 |
| Castor oil polyol | 14 |
| Polytetrafluoroethylene resin | 32 |
| Silicone oil | 32 |
| Carbon black | 2 |
| Dibutyltin dilaurate | 0.52 |
| Solvent (toluene, cyclohexanone, trichloroethylene, tetrachloroethylene) | 5528 |

The urethane prepolymer shown in Table 5 was prepared by mixing 100 parts by weight of urethane prepolymer (A) and 40 parts by weight of urethane prepolymer (B) which are shown below.

Urethane prepolymer (A):

This urethane prepolymer was prepared by reacting the composition shown in Table 6 at 80° C. for 3 hours in dry nitrogen gas.

TABLE 6

| | unit: parts by weight |
|---|---|
| Trimethylolpropane | 100 |
| 4,4'-diphenylmethane diisocyanate | 553 |
| Ethyl acetate | 487 |

Urethane prepolymer (B):

This urethane prepolymer was prepared by reacting the composition shown in Table 7 at 80° C. for 3 hours in dry nitrogen gas.

TABLE 7

| | unit: parts by weight |
|---|---|
| Polyester polyol produced from 1,4-butanediol and adipic acid (OH value = 56) | 1000 |
| 4,4'-diphenylmethane diisocyanate | 100 |
| Toluene | 2000 |

Table H below shows Examples 1 to 5. The weatherstrip base of the composition as shown in the above-mentioned Table 1 was dipped in the primer composition shown below. After air-drying for 1 hour, the urethane paint shown in Table 5 was applied, followed by curing at room temperature for 24 hours.

TABLE H

| | unit: parts by weight | | | | |
|---|---|---|---|---|---|
| Example | Hydroxyl group-containing polymer | | Compound having $\overset{O}{\underset{\|}{-C}}-\overset{X}{\underset{\|}{N}}-$ bond | | Toluene |
| 1 | Polytail H | 5 | Trichloroisocyanuric acid | 1.0 | 95 |
| 2 | Polytail H | 5 | N—bromosuccinimide | 1.0 | 95 |
| 3 | Polytail HA | 5 | Trichloroisocyanuric acid | 0.5 | 95 |
| 4 | Polytail HA | 5 | Trichloroisocyanuric acid | 2 | 95 |
| 5 | Polytail HA | 10 | Trichloroisocyanuric acid | 2 | 95 |

The weatherstrip base treated in Examples 1 to 5 as shown in Table H above was examined for wear resistance according to the following test methods.

(1) Wear resistance test with a glass edge wear tester which is an improved version of Gakushin-type wear tester.

Test conditions

| Abrader: | Glass, 5 mm thick |
|---|---|
| Cycle of abrading motion | 60 cycles/minute |
| Stroke of abrader | 70 mm |

Test method

Normal wear: The weatherstrip base mounted on the tester is rubbed against the abrader under normal conditions. The test results are shown in Table 8.

TABLE 8

| Example | Wear resistance | (cycles) |
|---|---|---|
| 1 | Good* | 50,000 |
| 2 | Good | 50,000 |
| 3 | Good | 50,000 |
| 4 | Good | 50,000 |
| 5 | Good | 50,000 |

*The base was not exposed after the wear test.

(2) 180° flexural test

The weatherstrip base treated in Examples 1 to 5 was subjected to 180° flexure repeatedly. None of the specimens tested fail owing to their flexibility characteristic of vulcanized polyolefin rubber.

In the following Comparative Examples, the weatherstrip bases in the above-mentioned examples were treated with a conventional primer composition for vulcanized polyolefin rubber.

COMPARATIVE EXAMPLE 1

A primer composition was prepared from "Esterresine-20" (trade name for saturated polyester made by Toyoboseki Co., Ltd.) and a 1:9 mixed solvent of methyl ethyl ketone and toluene.

COMPARATIVE EXAMPLE 2

A primer composition was prepared from "Vinylite-VMCH" (trade name of vinyl chloride-vinyl acetate copolymer made by Union Carbide Co., RT) and a 1:1 mixed solvent of methyl ethyl ketone and toluene.

COMPARATIVE EXAMPLE 3

A primer composition was prepared from "Eslex BM-2" (trade name for butyral resin made by Sekisui Chemical Industry Co., Ltd.) and a 1:1 mixed solvent of butanol and xylene.

COMPARATIVE EXAMPLE 4

A primer composition was prepared from "Olyster M55-80A" (trade name for moisture-curable polyurethane resin made by Mitsui Toatsu Chemical Industry Co., Ltd.) and toluene.

COMPARATIVE EXAMPLE 5

A primer composition was prepared from a 1:1.5 mixture of "Desmophen-100" (trade name for polyhydroxyl compound made by Bayer AG) and "Desmodur-R" (trade name for polyisocyanate made by Bayer AG) and a mixed solvent of methylene glycol, butyl acetate, ethyl acetate, and toluene.

COMPARATIVE EXAMPLE 6

A primer composition was prepared from "Becozol J-534" (trade name for linseed oil-modified long oil alkyd resin made by Dainippon Ink Chemical Industry Co., Ltd.), cobalt naphthenate (dryer), and mineral base.

COMPARATIVE EXAMPLE 7

A primer composition was prepared from a 4:1 mixture of "Becozol J-524" (trade name for linseed oil-modified long oil alkyl resin made by Dainippon Ink Chemical Industry Co., Ltd.) and "Super-Bekamin J-820" (trade name for butylated melamine resin made by Dainippon Ink Chemical Industry Co., Ltd.) and xylene.

COMPARATIVE EXAMPLE 8

A primer composition was prepared from a 99:1 mixture of "Acryloid C-110V" (trade name for thermoplastic acrylic resin made by Rom & Hase Co., Ltd.) and nitrocellulose and toluene.

COMPARATIVE EXAMPLE 9

A primer composition was prepared from a 4:1 mixture of "Acrydic 47-712" (trade name for thermosetting acrylic resin made by Dainippon Ink Chemical Industry Co., Ltd.) and "Super-Bekamin 47-508" (trade name for butylated melamine resin made by Dainippon Ink Chemical Industry Co., Ltd.) and a mixed solvent of toluene and butyl acetate.

The weatherstrip bases treated with the primer compositions prepared in the above-mentioned Comparative Examples 1 to 9 were examined for wear resistance with the above-mentioned tester. The results are shown in Table 9.

TABLE 9

| Compar. Example | Wear resistance | (cycles) |
|---|---|---|
| 1 | Poor* | 200 |

TABLE 9-continued

| Compar. Example | Wear resistance | (cycles) |
|---|---|---|
| 2 | Poor | 150 |
| 3 | Poor | 300 |
| 4 | Poor | 500 |
| 5 | Poor | 400 |
| 6 | Poor | 500 |
| 7 | Poor | 400 |
| 8 | Poor | 130 |
| 9 | Poor | 145 |

*The base was exposed after the cycles of abrasion indicated.

It is noted from the above test results that the weatherstrip base coated with the primer composition of the example is greatly improved in wear resistance over the one coated with the conventional primer composition.

Second Embodiment

The following description is concerned with the base material constituting the automotive glass run body and the primer composition and urethane paint for the glass run.

The base material constituting the automotive glass run is vinyl chloride resin or synthetic rubber, especially vulcanized polyolefin rubber. (The latter has found general use as not only glass run but also automotive rubber parts because of its much better weather resistance, aging resistance, and ozone resistance than the conventional synthetic rubbers.)

Therefore, the glass run in the second embodiment was made of vinyl chloride resin or vulcanized polyolefin rubber.

The vulcanized polyolefin rubber is the same as that used in the above-mentioned first embodiment. The primer composition is the same as that used in the above-mentioned first embodiment. In addition, the primer composition contains the hydroxyl group-containing polymer and the compound having the bond (where X is a halogen) which are the same as those in the first embodiment.

To prepare the primer composition, 100 parts by weight or less, preferably 50 parts by weight or less of these compounds and 100 parts by weight of the above-mentioned hydrocarbon polymer are dissolved in a solvent, which is the same a that used in the above-mentioned first embodiment.

The urethane paint used in the second embodiment is composed mainly of the urethane prepolymer which is described in detail in the following.

This paint is composed of the following components.

(A) Urethane prepolymer having terminal hydroxyl groups which is obtained by reacting 0.6 to 0.95 mol of polyester polyol (having a molecular weight of 10000 to 30000) with 1 mol of organic diisocyanate. The polyester polyol is produced from a $C_2-C_6$ saturated hydrocarbon diol and a $C_4-C_6$ organic dicarboxylic acid. (100 parts by weight)

(B) Urethane prepolymer having terminal hydroxyl groups which is obtained by reacting a low-molecular weight polyol with an organic diisocyanate. (1 to 100 parts by weight)

(C) Fluorine plastics (2 to 100 parts by weight)

(D) Silicone oil (5 to 100 parts by weight)

The above-mentioned $C_2$–$C_6$ saturated hydrocarbon diol includes, for example, propylene glycol, butanediol, pentanediol, and hexanediol; and the organic dicarboxylic acid includes adipic acid and succinic acid.

The low-molecular weight polyol includes, for example, glycerin and trimethylolpropane; and the organic diisocyanate includes, for example, 4,4'-diphenylmethane diisocyanate and 4,4'-diphenylether diisocyanate.

The fluorine plastics includes, for example, tetrafluoroethylenehexafluoroprpylene copolymer resin, trifluorochloroethylene resin, and fluorovinylidene resin; and the silicone oil includes, for example, dimethyl silicone, chloromethyl silicone, methylphenyl silicone, and fluorosilicone.

The above-mentioned paint composition may be incorporated with inorganic and organic additives such as castor oil polyol, silica, talc, clay, calcium carbonate, chlorinated polypropylene, chlorinated polyethylene, nylon fiber, and glass fiber, if necessary.

In addition, the paint composition may be incorporated with any one of dibutyltin diacetate, dibutyltin dioctoate, dibutyltin dilaurate, tributyltin acetate, tributyltin octoate, tributyltin laurate, dioctyltin diacetate, dioctyltin dilaurate, dioctyltin dioleate, and monomethyltin dioleate, which is used to promote the urethane reaction when the paint composition is prepared or when it is applied to the substrate.

The solvent used for the preparation of the abovementioned paint composition may be selected from acetone, methyl ethyl ketone, methyl isobutyl ketone, benzene, toluene, xylene, methyl acetate, ethyl acetate, isopropyl acetate, trichloroethylene, 1,1,1-trichloroethane, and dimethyl formamide.

No special equipment is required for the application of the above-mentioned primer composition and urethane paint to the glass run base material.

In other words, the primer composition diluted with the above-mentioned solvent to a proper viscosity may be applied in the usual way such as dipping, brushing, or spraying, followed by curing at room temperature for several hours or heating at 180° C. or below, preferably 100° C. or below for several minutes.

Being one-pack type, the primer composition has a long pot-life, and it can be diluted again with a solvent when it becomes viscous due to evaporation of solvent.

The urethane paint may also be applied in the same way as mentioned above.

The effect of the second embodiment is described in detail with reference to the following examples.

The base material of the glass run used in the examples was prepared in the following manner. (Parts in the following description are by weight.)

Base material (1)

A compound of the formulation shown in Table 10 was extruded at 130° to 140° C., whereby the base material of vinyl chloride resin was produced.

TABLE 10

| Polyvinyl chloride | 100 parts |
|---|---|
| Dioctyl phthalate | 75 |
| Barium stearate | 2 |
| Dibutyltin dilaurate | 1 |
| Zinc stearate | 1 |

Base material (2)

An EPDM compound of the formulation shown in Table 1 was extruded and vulcanized at 160° C. for 30 minutes, whereby the glass run was produced.

Then, the above-mentioned urethane prepolymers (A) and (B) which are principal ingredients of the urethane paint were prepared in the same manner as in the above-mentioned first embodiment.

The following Table i shows the base material, primer composition, and urethane paint used in the examples.

The primer composition was applied to the base material by dipping method, followed by air-drying for 1 hour. Then, the urethane paint was applied, followed by curing at room temperature for 24 hours.

TABLE i unit: parts by weight

| Example | Primer composition | | Base material | Urethane paint |
|---|---|---|---|---|
| | Hydroxyl group-containing polymer | Compound having $\overset{O}{\underset{\|}{-C}}-\overset{X}{\underset{\|}{N}}-$ bond | Organic solvent | | |
| 1 | Polytail H 5 | Trichloroisocyanuric acid 1 | Toluene 95 | (1) | Table A |
| 2 | Polytail H 5 | Trichloroisocyanuric acid 1 | Toluene 95 | (2) | Table A |
| 3 | Polytail H 5 | N—bromosuccinimide 1 | Toluene 95 | (1) | Table B |
| 4 | Polytail H 5 | N—bromosuccinimde 1 | Toluene 95 | (2) | Table B |
| 5 | Polytail H 5 | Trichloroisocyanuric acid 0.5 | Toluene 95 | (2) | Table A |
| 6 | Polytail H 5 | Trichloroisocyanuric acid 2 | Toluene 95 | (1) | Table A |
| 7 | Polytail HA 10 | Trichloroisocyanuric acid 1 | Toluene 90 | (1) | Table A |

TABLE A

| Urethane paint | |
|---|---|
| Urethane prepolymer (B) | 100 parts |
| Castor oil polyol (OH value = 80) | 14 |
| Urethane prepolymer (A) | 40 |
| Tetrafluoroethylene resin | 32 |
| Silicone oil | 32 |
| Carbon black | 2.0 |
| Dibutyltin dilaurate | 0.52 |
| Solvent (toluene, cyclohexanone, trichloroethylene, tetrachloroethylene) | 552.8 |

TABLE B

| Urethane paint | |
|---|---|
| Urethane prepolymer (B) | 100 parts |
| Castor oil polyol (OH value = 86) | 32 |
| Urethane prepolymer (A) | 56 |
| Tetrafluoroethylene resin | 32 |
| Silicone oil | 32 |
| Carbon black | 2.0 |
| Dibutyltin dilaurate | 0.52 |
| Solvent (toluene, cyclohexanone, trichloroethylene, tetrachloroethylene) | 552.8 |

The following Comparative Examples 1 to 6 show the formulations of the conventional paints applied to the base material of the glass run.

TABLE 17

| Comparative Example 1 | |
|---|---|
| Polyvinyl chloride | 25 parts |
| Tetrahydrofuran | 75 |
| Carbon black | 3 |

TABLE 18

| Comparative Example 2 | |
| --- | --- |
| Polyvinyl chloride | 25 parts |
| Tetrahydrofuran | 75 |
| Dimethylsilicone oil | 5 |
| (Viscosity = ca. 500,000 cSt.) | |
| Carbon black | 4 |

TABLE 19

| Comparative Example 3 | |
| --- | --- |
| Polyvinyl chloride | 25 parts |
| Tetrahydrofuran | 75 |
| Dimethylsilicone oil | 5 |
| (Viscosity = ca. 10,000 cSt.) | |
| Carbon black | 4 |
| Tetrafluoroethylene resin | 5 |

TABLE 20

| Comparative Example 4 | |
| --- | --- |
| Polyvinyl chloride | 25 parts |
| Tetrahydrofuran | 75 |
| Dimethylsilicone oil | 10 |
| (Viscosity = ca. 60,000 cSt.) | |
| Carbon black | 5 |
| Aluminum oxide | 2 |

TABLE 21

| Comparative Example 5 | |
| --- | --- |
| Polyvinyl chloride | 25 parts |
| Tetrahydrofuran | 75 |
| Dimethylsilicone oil | 6 |
| (Viscosity = ca. 10,000 cSt.) | |
| Carbon black | 3 |
| Glass beads | 2 |

TABLE 22

| Comparative Example 6 | |
| --- | --- |
| Polyvinyl chloride | 25 parts |
| Tetrahydrofuran | 75 |
| Dimethylsilicone oil | 5 |
| (Viscosity = ca. 10,000 cSt.) | |
| Carbon black | 3 |
| Zinc stearate | 3 |

The base materials (1) used in the above-mentioned examples were coated with the paint composition (diluted with a solvent) in the above-mentioned comparative example, followed by drying at room temperature for 24 hours.

The base materials of the Examples and Comparative Examples were examined for wear resistance with a KI-type abrasion tester according to the following test methods.

Test conditions

| Abrader: | Glass, 5 mm thick |
| --- | --- |
| Load | 3 kg |
| Cycle of abrader | 60 cycles/minute |
| Stroke of abrader | 145 mm |

Test method

The base material mounted on the tester is rubbed against the abrader under the conditions mentioned above.

Test (1): Wear resistance after heat aging

The samples were allowed to stand in an oven at 80° C. for 200 hours and then subjected to wear resistance test at room temperature. The test results are shown in Table 11.

TABLE 11

| Example | Wear resistance | (cycles) |
| --- | --- | --- |
| Example 1 | Good | 10,000 |
| Example 2 | Good | 10,000 |
| Example 3 | Good | 10,000 |
| Example 4 | Good | 10,000 |
| Example 5 | Good | 10,000 |
| Example 6 | Good | 10,000 |
| Example 7 | Good | 10,000 |
| Compar. Example 1 | Poor | 25 |
| Compar. Example 2 | Poor | 50 |
| Compar. Example 3 | Poor | 50 |
| Compar. Example 4 | Poor | 45 |
| Compar. Example 5 | Poor | 45 |
| Compar. Example 6 | Poor | 30 |

Good: Base is not exposed after abrasion.
Poor: Base is exposed after the cycles of abrasion indicated.

Test (2): Wear resistance after weathering

The samples were exposed to a Weather-O-meter equipped with two carbon arc lamps for 200 hours, and then subjected to wear resistance test at room temperature. The results are shown in Table 12.

TABLE 12

| Example | Wear resistance | (cycles) |
| --- | --- | --- |
| Example 1 | Good | 10,000 |
| Example 2 | Good | 10,000 |
| Example 3 | Good | 10,000 |
| Example 4 | Good | 10,000 |
| Example 5 | Good | 10,000 |
| Example 6 | Good | 10,000 |
| Example 7 | Good | 10,000 |
| Compar. Example 1 | Poor | 20 |
| Compar. Example 2 | Poor | 30 |
| Compar. Example 3 | Poor | 30 |
| Compar. Example 4 | Poor | 35 |
| Compar. Example 5 | Poor | 40 |
| Compar. Example 6 | Poor | 30 |

Test (3): Wear resistance in a highly humid atmosphere

The samples were subjected to wear resistance test in a highly humid atmosphere at 60° C. The results are shown in Table 13.

TABLE 13

| Example | Wear resistance | (cycles) |
| --- | --- | --- |
| Example 1 | Good | 10,000 |
| Example 2 | Good | 10,000 |
| Example 3 | Good | 10,000 |
| Example 4 | Good | 10,000 |
| Example 5 | Good | 10,000 |
| Example 6 | Good | 10,000 |
| Example 7 | Good | 10,000 |
| Compar. Example 1 | Poor | 20 |
| Compar. Example 2 | Poor | 60 |
| Compar. Example 3 | Poor | 50 |
| Compar. Example 4 | Poor | 50 |
| Compar. Example 5 | Poor | 50 |
| Compar. Example 6 | Poor | 40 |

The above-mentioned test results indicate that the glass run base materials coated with the primer composition and urethane paint in the above-mentioned examples are incomparably superior in wear resistance after heat aging, wear resistance after weathering, and wear resistance in a highly humid atmosphere to those which are treated in the conventional manner.

Third Embodiment

The following description is concerned with the flocked glass run for automobiles which is made up of the base material, primer layer, urethane paint layer, and electrostatic flock pile.

The base material is made of the same vulcanized polyolefin rubber as used in the above-mentioned two embodiments. The rubber is incorporated with the same additives as in the above-mentioned first embodiment.

The primer composition used in this third embodiment is the same as that used in the above-mentioned two embodiments, and the primer composition contains the hydrocarbon polymer and the compound having the bond (where X is a halogen) which are the same as those used in the above-mentioned two embodiments.

To prepare the primer composition, 100 parts by weight or less, preferably 50 parts by weight or less of these compounds and 100 parts by weight of the above-mentioned hydrocarbon polymer are dissolved in a solvent, which is the same as that used in the above-mentioned two embodiments.

It is possible to use a urethane adhesive of one-pack type to form a urethane coating layer. It is preferable to add silicone oil to improve wear resistance.

No special equipment is required for the application of the above-mentioned primer composition and urethane adhesive to the glass run base material. In other words, the primer composition may be diluted with a solvent (and, if necessary, the solution may be heated to adjust the viscosity), and the solution may be applied in the usual way such as dipping, spraying, and brushing.

Being of one-pack type, the primer composition has a very long pot-life, and it can be diluted again with a solvent to adjust viscosity when it becomes viscous due to evaporation of solvent.

Needless to say, the urethane adhesive can be applied in the above-mentioned way.

The pile is composed of short fibers of, for example, nylon, polyethylene terephthalate, rayon, or cotton.

The third embodiment will be described in detail with reference to the following examples.

At first, an EPDM composition of the formulation as shown in the above-mentioned Table 1 was extruded, followed by vulcanization at 160° C. for 30 minutes, whereby the base material for an automotive glass run was prepared.

The urethane adhesive used in the following Examples is a one-pack type urethane polymer having terminal isocyanate groups which is composed of polyol and polyisocyanate. (See Japanese Patent Laid-open No. 25865/1975.)

In the following Examples and Comparative Examples, the pile is composed of short fibers of 6,6-nylon.

EXAMPLE 1

The glass run base material of the formulation shown in the above-mentioned Table 1 was coated by dipping with the primer composition of Example 1 in the above-mentioned first embodiment. After air-drying for 1 hour, the urethane paint was applied and electrostatic flocking with short fibers of 6,6-nylon was performed, followed by curing at room temperature for 24 hours.

EXAMPLES 2 TO 5

The same treatment as in Example 1 was carried out except that the formulation of the primer composition was changed.

The formulation of the primer composition in Examples 2 to 5 is the same as that in Examples 2 to 5 shown in Table H for the above-mentioned first embodiment.

The flocked glass runs treated in Examples 1 to 5 were examined for wear resistance of flocking with a KI type wear resistance tester.

The test method and test conditions are the same as those used in the above-mentioned second embodiment.

The test results are shown in Table 14.

TABLE 14

| Example | Wear resistance | (cycles) |
| --- | --- | --- |
| Example 1 | Good | 10,000 |
| Example 2 | Good | 10,000 |
| Example 3 | Good | 10,000 |
| Example 4 | Good | 10,000 |
| Example 5 | Good | 10,000 |

Good Base material was not exposed after repeated abrasion.

In the following Comparative Examples, the glass run base material used in the above-mentioned Examples was coated with a conventional primer for the vulcanized polyolefin rubber.

COMPARATIVE EXAMPLE 1

A primer composition was prepared from "Becozol J-534" (trade name for linseed oil-modified long oil alkyd resin made by Dainippon Ink Chemical Industry Co., Ltd.), cobalt naphthenate (dryer), and mineral base.

COMPARATIVE EXAMPLE 2

A primer composition was prepared from "Olyster M55-80A" (trade name for moisture-curable polyurethane resin made by Mitsui Toatsu Chemical Industry Co., Ltd.) and toluene.

COMPARATIVE EXAMPLE 3

A primer composition was prepared from "Esterresine-20" (trade name for saturated polyester made by Toyoboseki Co., Ltd.) and a 1:9 mixed solvent of methyl ethyl ketone and toluene.

The flocked glass runs treated with the primer compositions of the above-mentioned Comparative Examples 1 to 3 were examined for wear resistance with the above-mentioned tester. The results are shown in Table 15.

TABLE 15

| Compar. Example | Wear resistance | (cycles) |
| --- | --- | --- |
| Compar. Example 1 | Poor | 150 |
| Compar. Example 2 | Poor | 100 |
| Compar. Example 3 | Poor | 120 |

Poor: The base material was exposed after the cycles of abrasion indicated.

The above-mentioned test results indicate that the flocked glass run coated with the primer composition in the above-mentioned examples are incomparably superior in wear resistance to those which are treated in the conventional manner.

Fourth Embodiment

The following description is concerned with the structure of attaching a molding to an automobile which is the fourth embodiment of this invention.

According to this embodiment, a molding is attached to an automobile with an adhesive tape. The constituent components of the adhesive tape are described in detail below.

The primer is composed of a hydrocarbon polymer having saturated or partly saturated main chains with at least one terminal hydroxyl group, or a polyhydroxypolyolefin with terminal hydroxyl groups having an average molecular weight of 1000 to 5000 ("Polytail H or Polytail HA", trade name of Mitsubishi Chemical Industries, Ltd.) and a compound having the bond (where X is a halogen) in the molecule.

The hydrocarbon polymer and the compound having the bond (where X is a halogen) are the same as those used in the above-mentioned embodiments.

To prepare the primer, 100 parts by weight or less, preferably 50 parts by weight or less of these compounds and 100 parts by weight of the above-mentioned hydrocarbon polymer are dissolved in a solvent.

The concentration of the primer should be lower than 30%; otherwise, solids might separate out.

The topcoating is described below. The topcoating is an acrylic composition which is formed by adding a polyisocyanate to a polymer composed of non-functional acrylic monomer and functional acrylic monomer and/or organic acid.

The non-functional acrylic monomer denotes esters of acrylic acid and methacrylic acid, which include, for example, methyl, ethyl, propyl, isopropyl, butyl, isobutyl, sec-butyl, t-butyl, cyclohexyl, 2-ethylhexyl, lauryl, tridecyl, stearyl, and benzyl esters.

The functional acrylic monomer denotes esters of acrylic acid and methacrylic acid having a hydroxyl group in the molecule, which include, for example, 2-hydroxyethyl and 2-hydroxypropyl esters.

The organic acid includes, for example, maleic acid, maleic anhydride, fumaric acid, citraconic acid, citractonic anhydride, itaconic acid, and itaconic anhydride.

The polyisocyanate includes, for example, tolylene diisocyanate, 4,4'-diphenylmethane diisocyanate, hydrogenated 4,4'-diphenylmethane diisocyanate, 1,5-naphthalene diisocyanate, xylene diisocyanate, hydrogenated xylene diisocyanate, isophorone triisocyanate, 1,6-hexamethylene diisocyanate, 4,4',4''-triphenylmethane diisocyanate, and tris(p-isocyanatephenyl)thiophosphate.

The above-mentioned primer and topcoating may be dissolved in benzene, toluene, xylene, n-hexane, cyclohexane, methyl ethyl ketone, methyl acetate, ethyl acetate, isopropyl acetate, or isobutyl acetate.

The above-mentioned primer and topcoating are applied in two layers to both sides of tape to prepare double-coated adhesive tape, and this adhesive tape is used to attach a molding to an automotive body. This is described with reference to FIGS. 1 and 2.

Figure 1:
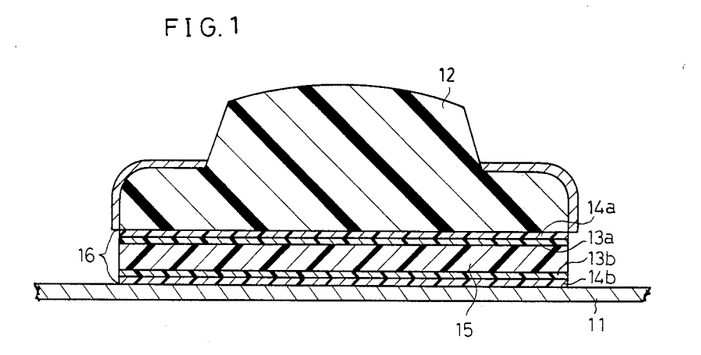
FIG. 1 and FIG. 2 are sectional views showing the structure of attaching a molding to an automobile, which is one embodiment of this invention.

As shown in FIG. 1, a tape (15) made of synthetic resin foam and the primer layers (13a, 13b) and the topcoating layers (14a, 14b) on both sides of the film form the double-coated adhesive tape (16). A molding (12) is attached to the automotive body (11) by means of the adhesive tape (16).

Figure 2:
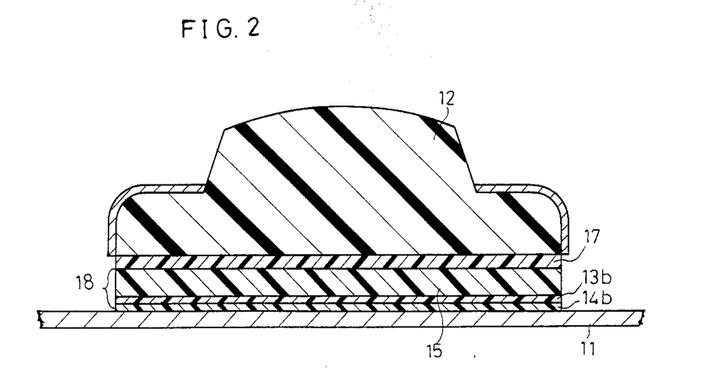

In the case of FIG. 2, the double-coated adhesive tape (18) is made up of a tape (15) of synthetic resin foam, the primer layer (13b) and the topcoating layer (14b) on one side of the film, and the CR adhesive layer (17) on the other side of the film. A molding (12) is attached to the automotive body (11) by means of the adhesive tape (18).

As shown above, the double-coated adhesive tape makes it possible to attach a molding to the automotive body without a complicated means, and yet it keeps the molding in position for a long time.

The effect of the fourth embodiment is shown below with reference to experiments.

Test method

A single-coated adhesive tape was prepared by coating one side of polyethylene foam tape (expansion ratio=5) with the primer, followed by air-drying at room temperature for 30 minutes, and then with the topcoating, followed by air-drying at room temperature for 30 minutes.

Two pieces of the single-coated adhesive tape were bonded together with the adhesive layers facing each other. After standing for 3 days, the tensile shear strength of the bonded tape was measured at a pulling rate of 30 mm/min. The following Tables 16 to 22 show the compositions of the topcoating and primer. (Quantities in the tables are expressed as parts by weight.)

TABLE 16

| Topcoating 1 | |
|---|---|
| Butyl methacrylate | 98 parts |
| Maleic anhydride (acid value = 20–25) | 2 |
| BPO (benzoyl peroxide) | 0.05 |
| Solvent (toluene:cyclohexane:ethyl acetate = 1:1:1) | 63 |

The components shown in Table 16 were reacted with one another at 80° C. for 12 hours, and to the reaction product was added 3 parts of 2.6% solution of isophorone diisocyanate in toluene.

TABLE 17

| Topcoating 2 | |
|---|---|
| Ethyl methacrylate | 20 parts |
| 2-Hydroxypropyl methacrylate | 10 |
| BPO (benzoyl peroxide) | 0.05 |
| Toluene | 70 |

The components shown in Table 17 were reacted with one another at 80° C. for 12 hours, and to the reaction product was added 5 parts of 2.6% solution of isophorone diisocyanate in toluene.

TABLE 18

| Topcoating 3 | |
|---|---|
| Methyl acrylate | 20 parts |
| 2-Hydroxyethyl methacrylate | 5 |
| Fumaric acid (acid value = 30) | 5 |
| BPO (benzoyl peroxide) | 0.05 |
| Xylene | 70 |

The components shown in Table 18 were reacted with one another at 80° C. for 12 hours, and to the reaction product was added 4 parts of 20% solution of 4,4',4"-triphenylmethane triisocyanate in toluene.

TABLE 19

| Primer 1 | |
|---|---|
| Polytail H | 5 parts |
| Trichloroisocyanuric acid | 1 |
| Toluene | 94 |

TABLE 20

| Primer 2 | |
|---|---|
| Polytail H | 5 parts |
| N—bromosuccinimide | 1 |
| Toluene | 94 |

TABLE 21

| Primer 3 | |
|---|---|
| Polytail HA | 5 parts |
| Trichloroisocyanuric acid | 0.5 |
| Toluene | 94 |

TABLE 22

| Primer 4 | |
|---|---|
| Polytail HA | 5 parts |
| Trichloroisocyanuric acid | 2 |
| Toluene | 94 |

Single-coated adhesive tape was prepared by applying the primer and topcoating in proper combination to one side of a tape substrate. Two pieces of the adhesive tape were bonded together with the adhesive layers facing each other. The tensile shear strength of the bonded tape was measured according to the above-mentioned test method.

Table 23 shows the combination of the topcoating and primer and Table 24 shows the tensile shear strength of the bonded tape.

TABLE 23

| Test No. | Topcoating | Primer |
|---|---|---|
| 1 | 1 | 1 |
| 2 | 1 | 2 |
| 3 | 1 | 3 |
| 4 | 1 | 4 |
| 5 | 2 | 1 |
| 6 | 3 | 1 |
| 7 | 2 | 2 |
| 8 | 3 | 3 |

TABLE 24

| Test No. | Tensile shear strength (g/cm$^2$) |
|---|---|
| 1 | 1320 |
| 2 | 1250 |
| 3 | 1200 |
| 4 | 1310 |
| 5 | 1280 |
| 6 | 1560 |
| 7 | 1400 |
| 8 | 1350 |

In the following Comparative Examples 1 to 3, the single-coated adhesive tape was prepared by applying one of the following conventional adhesives as a primer and the topcoating of test No. 1 mentioned above. The tensile shear strength was measured in the same manner as mentioned above. The results are shown in Table 25.

Composition 1

A primer was prepared by dissolving "Becozol J-534" (trade name for linseed oil-modified long oil alkyl resin made by Dainippon Ink Chemical Industry Co., Ltd.) in mineral base and adding cobalt naphthenate as a dryer.

Composition 2

A primer was prepared by dissolving "Olyster M55-80A" (trade name for moisture-curable polyurethane resin made by Mitsui Toatsu Chemical Industry Co., Ltd.) in toluene.

Composition 3

A primer was prepared by dissolving "Esterresine-20" (trade name for saturated polyester resin made by Toyoboseki Co., Ltd.) in a 1:9 mixed solvent of methyl ethyl ketone and toluene.

TABLE 25

| Comparative Example No. | Tensile shear strength (g/cm$^2$) |
|---|---|
| 1 | x |
| 2 | x |
| 3 | x | x too small to measure.

The above-mentioned test results indicate that the adhesives used in the experiments of this invention are incomparably superior in tensile shear strength to the conventional ones.

As many apparently widely different embodiments of this invention may be made without departing from the spirit and scope thereof, it is to be understood that the invention is not limited to the specific embodiments thereof except as defined in the appended claims.

What is claimed is:

1. An adhesive composition which comprises:
   (a) a hydrocarbon polymer having an average molecular weight of 500 to 10,000, said hydrocarbon polymer having a main chain with a degree of saturation greater than 90% and terminating at both ends of the chain with a hydroxyl or a carboxyl group; and
   (b) a halogenating agent to be incorporated in said hydrocarbon polymer, said agent being selected from the group consisting of alkyl hypohalide, a halogenated succinimide, and an isocyanuric acid halide.

2. An adhesive composition as claimed in claim 1, which comprises 100 parts by weight of said polymer and 0.01 to 300 parts by weight of alkyl hypohalide.

3. An adhesive composition as claimed in claim 1, which comprises 100 parts by weight of said polymer, and 0.5 to 100 parts by weight of a halogenated succinimide or an isocyanuric acid halide.

* * * * *